UNITED STATES PATENT OFFICE.

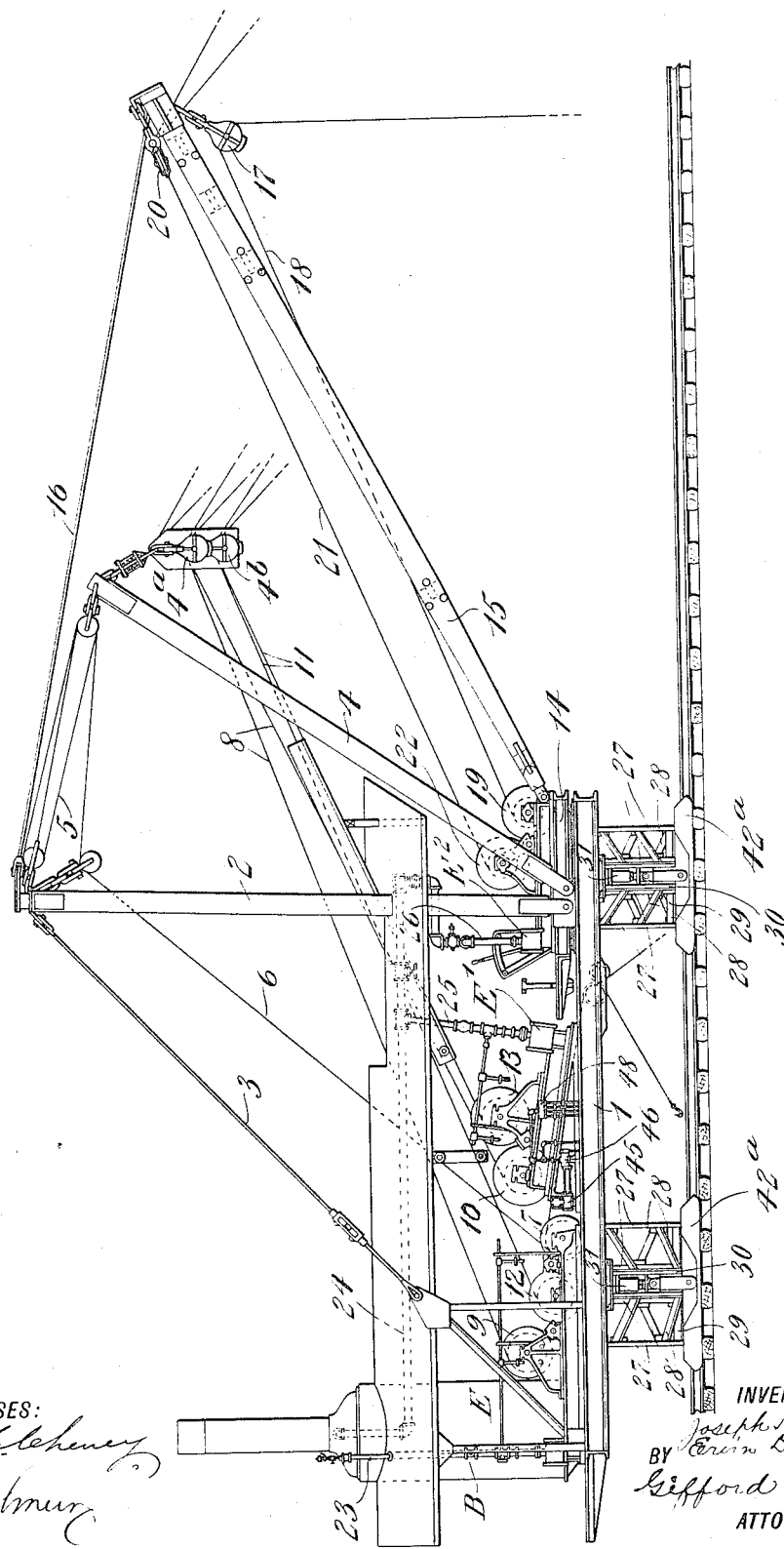

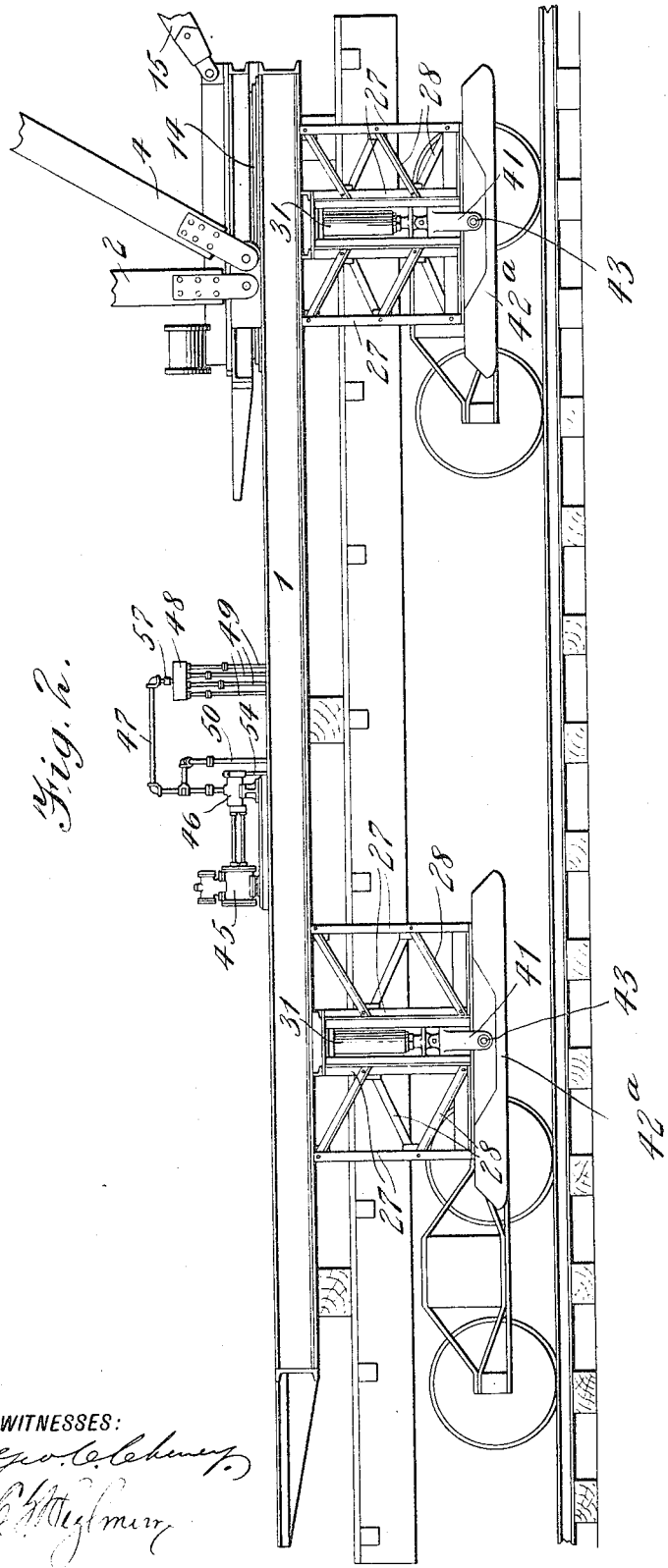

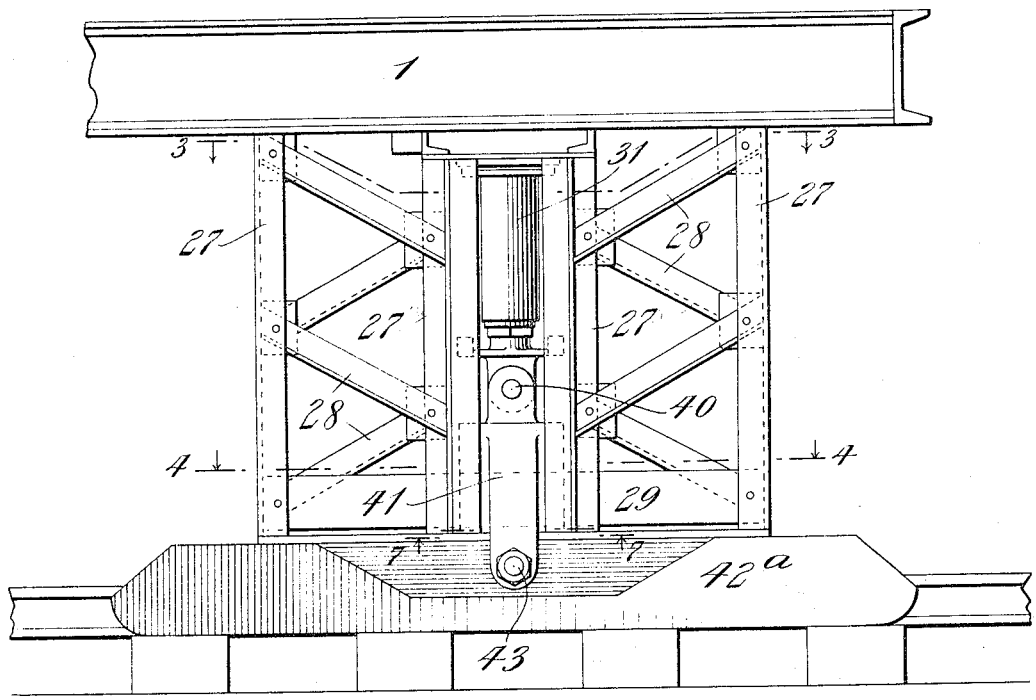

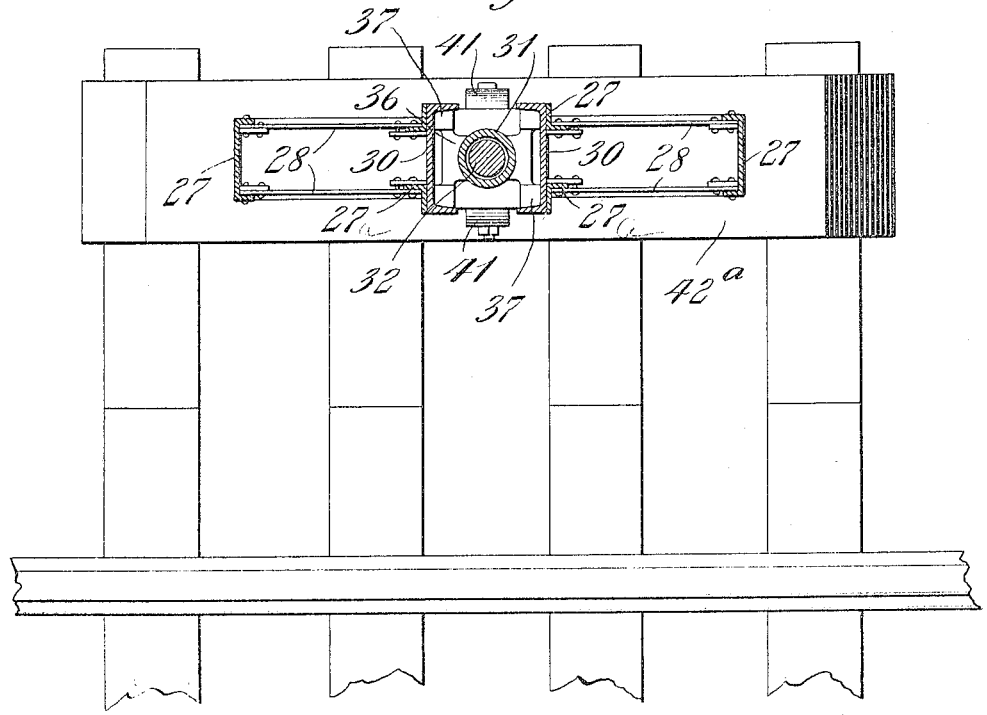
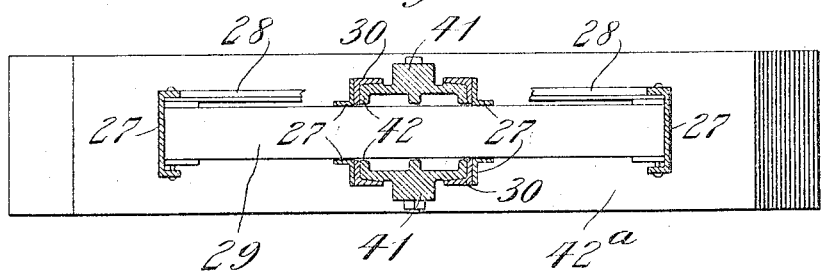

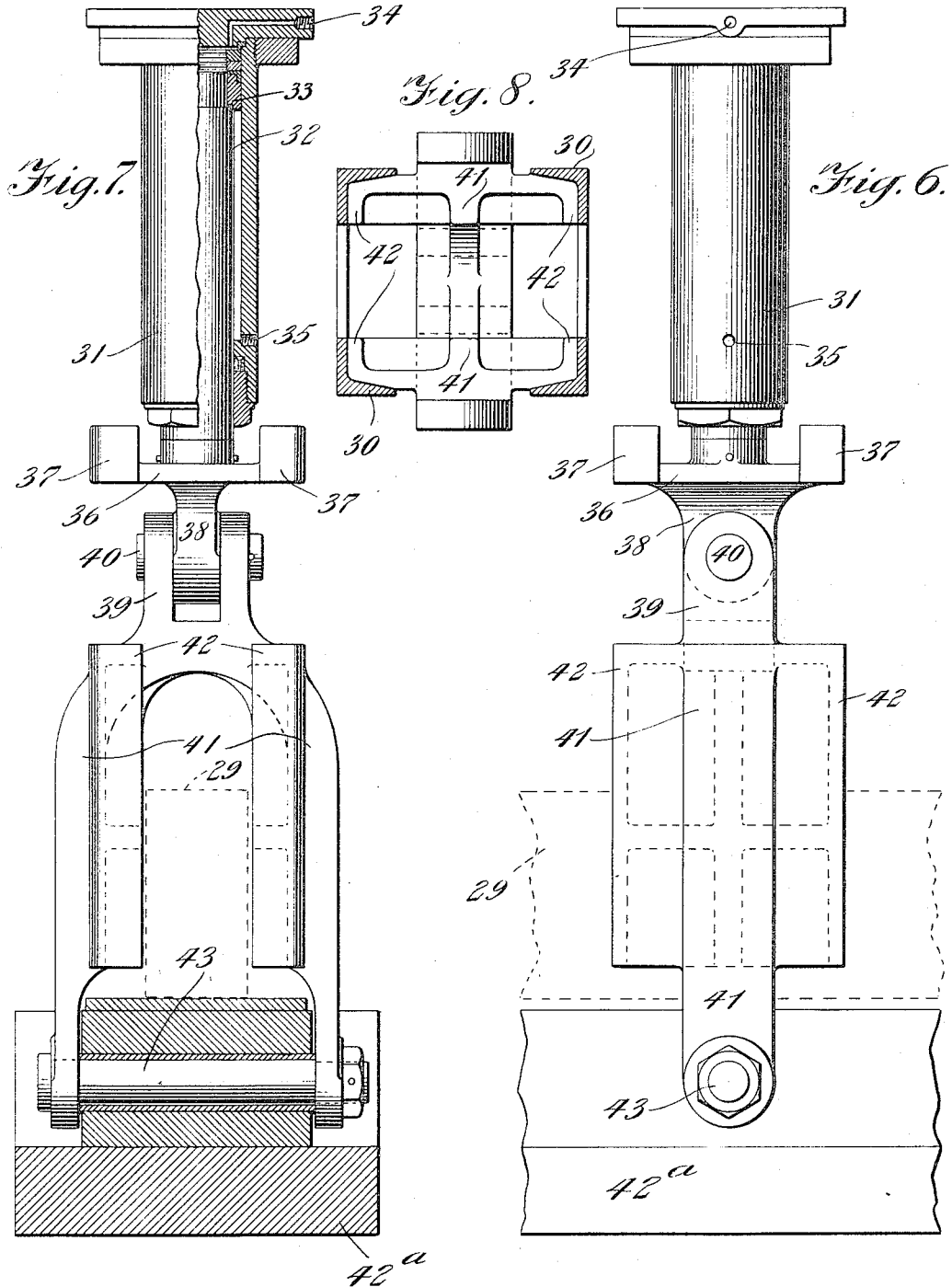

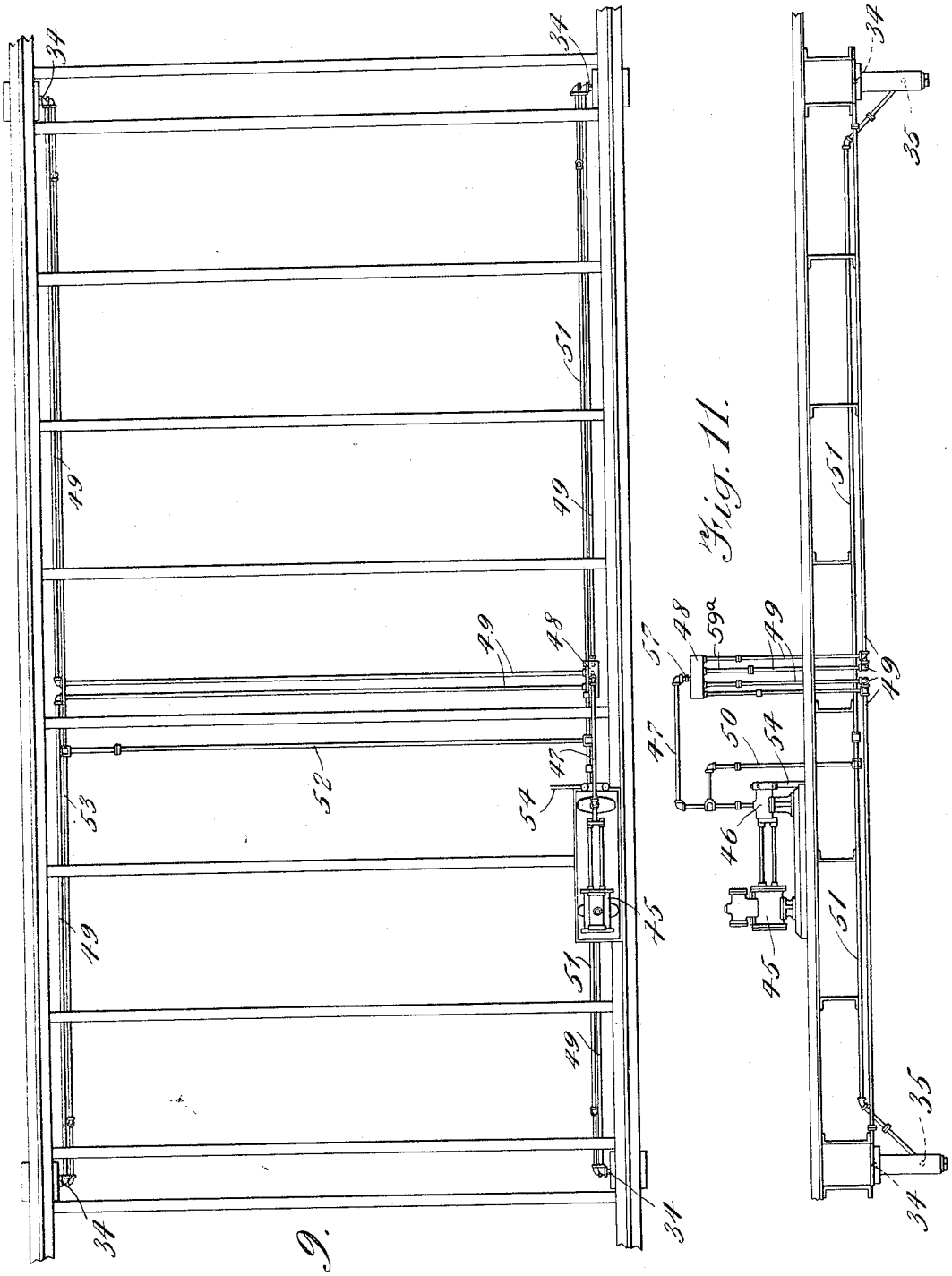

JOSEPH H. DICKINSON, OF MONTCLAIR, AND ERVIN D. SWAN, OF GLEN RIDGE, NEW JERSEY, ASSIGNORS TO LIDGERWOOD MANUFACTURING COMPANY, OF NEW YORK, N. Y., A CORPORATION OF NEW YORK.

PORTABLE LOGGING APPARATUS.

1,241,830.  Specification of Letters Patent.  Patented Oct. 2, 1917.

Application filed June 23, 1909. Serial No. 503,785.

*To all whom it may concern:*

Be it known that we, JOSEPH H. DICKINSON, a citizen of the United States, and a resident of Montclair, in the county of Essex and State of New Jersey, and ERVIN D. SWAN, a citizen of the United States, and a resident of Glen Ridge, in the county of Essex and State of New Jersey, have invented certain new and useful Improvements in Portable Logging Apparatus, of which the following is a specification.

Our invention relates to new and useful improvements in portable logging apparatus of the type generally movable along a trackway, and including a platform upon which are mounted means for skidding the logs, and loading them upon a transporting vehicle adapted to travel upon the trackway, the platform being provided with means for supporting it over the trackway so that the vehicles upon which the logs are loaded can pass beneath the platform, and successively come into position to have the logs loaded thereon.

The object of the invention is to provide simple and efficient means for loading the platform on and unloading it from a transporting car by means of which it is moved along the trackway, and for supporting the platform during the logging operation after it is unloaded from the car.

The invention consists in the improvements to be fully described hereinafter, and the novelty of which will be particularly pointed out and distinctly claimed.

We have fully and clearly illustrated our invention in the accompanying drawings to be taken as a part of this specification and wherein—

Figure 1 is a view in side elevation of a portable log loader and skidder illustrating our invention, the machine being shown supported for the passage of cars therebeneath;

Fig. 2 is a view in side elevation of a portable skidder and logger equipped with our invention, mounted upon a truck or car for transportation;

Fig. 3 is an enlarged view of the supporting leg and foot;

Fig. 4 is a section on the line 3—3 of Fig. 3;

Fig. 5 is a section on the line 4—4 of Fig. 3;

Fig. 6 is a detailed view of the jack partly in section, and the connecting means for the foot;

Fig. 7 is a detailed view of the jack partly in section and the connecting means taken at right angles to Fig. 6;

Fig. 8 is a section on the line 7—7 of Fig. 3;

Fig. 9 is a plan view of the piping system for the hydraulic jack;

Fig. 10 is a transverse detail sectional view of a supply header for the jack feed pipes.

Fig. 11 is a view in elevation of the piping system for the jacks.

Referring to the drawings by characters of reference, 1 designates a platform of a portable log skidding and loading apparatus, the same shown as being constructed of structural iron members, and of such dimensions and strength as suit it to the purposes for which it is intended.

This platform in the present instance is designed to be transported from place to place upon a suitable car or truck, and has mounted thereon the various apparatus and mechanisms applicable to the log skidding and loading operation. Rising from and supported on one end of the platform is an A-frame mast 2, supported in upright position by suitable guy rods 3 connected to opposite sides of the supporting platform. Pivoted to the platform adjacent the base of the mast 2, is the lower end of a vertically swinging log skidding boom 4, the latter carrying at its free end the upper and lower skidding blocks $4^a$, $4^b$ and being connected at said end to the mast by a running connection 5, the line 6 of which runs to a drum 7 forming part of the skidding engine E which is mounted on the platform at the end opposite to that upon which the mast above described is arranged. Running through the upper skidding blocks $4^a$ is a plurality of skidding lines 8, which run to drums 9, 10 of the main skidding engine E, and an auxiliary skidding engine E' respectively, and running through the blocks $4^b$ is a plurality of skidding lines 11, running to drums 12, 13 on said skidding engines, the auxiliary engine being mounted on the platform between the mast 2 and the main engine E.

Mounted at the forward end of the platform between the legs of the mast is a rotary table 14, upon which is pivotally secured the lower end of a loading boom 15, the free end of which is connected to the mast by a tie rod 16, and carries a block 17 for the loading line 18 which runs to a winding drum 19 of an engine $E^2$ mounted upon said rotary table 14. Carried by the swinging end of the loading boom are blocks 20, 20, through which run load boom swinging lines 21, 21, the outer ends of which are connected to suitable anchorages away from the machine, and the inner ends of which are wound upon suitable winding drums 22, 22, also mounted upon the turn-table and forming part of the engine $E^2$.

Steam for the engine E is furnished from the boiler B through a pipe 23, and for the engines $E'$ and $E^2$ from a horizontally disposed main 24 and lateral branches 25, 26.

Connected to the side members of the platform 1 are depending legs which in the present instance are shown as being constructed of structural metal in two parts, each part consisting of an outer vertical channel iron 27 and inner vertical parallel angle irons $27^a$, the latter, preferably two in number, and spaced apart in vertical alinement, the said channel iron 27 being so arranged that the flanges thereof project inwardly, and the angle irons arranged with one of their members projecting laterally and outwardly, and the other projecting toward the inner face of the channel iron 27. The inwardly projecting flanges on the channel irons $27^a$ projecting toward said first named flanges are connected by means of struts 28 whereby a rigid and serviceable construction is provided. The lower ends of all of the vertical members are connected by means of a transverse bar 29, which bridges the space between the two parts of the leg for a purpose to be presently described Associated with each of the four legs with which the platform is provided is a foot-piece which is extensible relatively to the leg so as in effect to lengthen the latter in order to raise the machine, and retractable to permit lowering of the machine after once having been raised. These foot-pieces are preferably in the form of beams or sills extending longitudinally of the platform and they are arranged to form a base or foundation upon which the legs of the platform may be lowered to sit when the platform is at rest during the logging operation. Any suitable means may be provided for moving the sills or foot-pieces relatively to the legs and platform, and for raising and lowering the platform and legs relative to the sills as a base, but I prefer to employ that means which will now be described. Mounted upon the inner face of each of the innermost vertical members of each of the legs is a channel iron 30, said irons being disposed with their channels facing each other as clearly shown in Figs. 4, 5 and 8. Located in the space between the irons 30 at a point adjacent the side frame member of the platform is the cylinder 31 of a hydraulic jack, said cylinder being vertically disposed and rigidly held between said channel irons. While the specific construction of this jack is immaterial to the purposes of this invention I would state that it is preferably of the double acting type wherein the fluid under pressure from a suitable source may be employed to move the plunger in both directions. Referring to Figs. 6 and 7 of the drawings, wherein the cylinder 31 is shown partly in section, 32 designates a piston or plunger having a head 33 closely fitting the internal bore of the cylinder, the latter being provided with ports 34, 35 at its opposite ends through which the motive fluid is admitted. The lower end of the plunger 32 when the latter is in its innermost or retracted position projects below the lower end of the cylinder and is provided with a transverse member 36, carrying at its ends spaced guiding projections 37, which project within the channels of the irons 30, and engage the web and flanges of the latter, as shown in Fig. 4, whereby the plunger is guided in its reciprocations.

Beyond the guiding projections 37, the plunger is formed with an apertured ear 38 projecting between two apertured ears 39 forming part of a link connection to be presently described, said ears being connected by a cross pin 40, whereby a knuckle or pivot joint is formed between the said link connection and the plunger. The link connection just referred to is formed with two spaced legs or members 41, each of which is provided with oppositely directed lateral extensions 42, 42, which engage the flanges and webs of the channel irons to guide the link in its movements. The members of the link straddle the transverse bar 29 and preferably closely engage the same so that the link is further guided and braced during its reciprocations.

At their lower ends the members 41, set over a foot-piece $42^a$, and are connected thereto at a point intermediate its ends by a pivot pin 43 passing through the foot-piece and said members. This foot-piece consists of a timber or beam of any suitable material and structure and is arranged to extend longitudinally of the platform, or parallel to the track upon which the machine travels, said foot-piece being preferably arranged to be placed in engagement with the ties of the track or other foundation outside the track rails and of such length as to bridge inequalities in the supporting surface upon which they rest and thereby provide a firm and substantial support for the platform.

The motive fluid is supplied to the several hydraulic jacks in the present instance from a steam hydraulic pump mounted upon the platform 1 adjacent the boiler. This steam pump comprises a power cylinder 45 adapted to actuate the piston of a pumping cylinder 46. From the pumping cylinder the fluid passes through a feed pipe 47 to a header or union 48 from which it is led by a plurality of branch pipes 49, to the upper ports 34 of the jack cylinders, and branching from the pipe 47 is another pipe 50 which is connected by a pipe 51 with the lower ports 35 of two of the jack cylinders 31 on one side of the platform. The pipe 51 is connected by a cross pipe 52 with a pipe 53 communicating with the lower ports 35 of the jack cylinders 31 on the opposite side of the machine. The suction or feed pipe for the pumping cylinder is shown at 54.

Any efficient valve mechanism may be employed for controlling the flow of motive fluid to the jack cylinders but we prefer to employ that shown in Fig. 10. In this figure is shown the header 48 above referred to, said header being preferably a metallic block formed with two parallel bores or chambers 55, 56, and with an inlet-bore 57 communicating directly with the bore 55, and connected to the feed pipe 47. Also located in the header are a plurality of transverse bores 58, each of which communicates with the bores 55, 56 through passages 59, 60 respectively, and at one end said bores 58 open into nipples 59ª to which the feed pipes to the several jack cylinders are connected. Suitable valves are employed for controlling the flow through the passages in the header; for this purpose the header is bored to provide a plurality of bores 61, there being a bore for each of the passages 59, 60 above described, said bores 61 being disposed at right angles to the transverse passages and to the chambers 55, 56. Arranged in each of the bores 61 is a reciprocating valve stem preferably of the turn-plug type, the stem coöperating with the passages 59 being indicated at 62, and those coöperating with the passages 60, at 63, said stems being each formed at their inner ends with a valve head 63ª adapted to coöperate with the valve seat formed by the body of the header surrounding that portion of the passages 59, 60 which communicates with the transverse passages 58. These valve stems are each formed adjacent the heads thereof with a reduced portion 64, of less diameter than that of the passage 58, so as to provide a free fluid space about said stem for the flow of fluid through said passage 58.

The passage or bore 55 is closed at both ends, but the passage 56 is closed at one end only, the other end being connected by an exhaust pipe with a water supply tank.

The operation and use of our present invention will be apparent from the following description: The portable skidder and loader as above premised is adapted for transportation upon a suitable truck or car, as shown in Fig. 2, and when so mounted may be moved to any desired locality where the logging operation is to take place. It will be understood that during transportation the platform is supported at such a height and the feet or sills for the supporting legs are so adjusted that said feet or sills travel at a distance above the trackway sufficient to clear all frogs, switches or other trackway appurtenances. Upon arriving at the desired point, and the car being brought to a standstill, the steam pump is started and the valves 62, which coöperate with the passages 59 are opened to permit the motive fluid to flow from the pump cylinder to the several jack cylinders. The fluid entering the ports 34 forces the pistons or plungers downward until the foot timbers or sills rest solidly upon the ends of the ties or other foundation outside of the track rails, and the flow to the jack cylinders being permitted to continue the platform will be raised to the proper height above its transporting vehicle, so that the vehicle may be pulled from under the platform. During this operation the water flows from the pump cylinder through the pipe 47 and inlet 57 into the feed passage 55, through the passage 59 into the transverse passages 58 and thence to the several feed pipes, the valves 63, coöperating with the passages 60 being left closed, but the water flowing past the same by way of the reduced portions 64 of said valves.

During this raising operation any water which may be in the lower portions of the jack cylinders flows back through the pipes 51 and 53, and back to the pipe 47 by way of the pipes 52 and 50.

The apparatus having been raised as just described, the same may then be lowered after the transporting car is withdrawn so that the legs rest solidly upon the foot-pieces or sills by leaving the feed valves 62 closed and opening the valves 63, in which event the water will bleed from the upper parts of the cylinder jacks out through the feed pipes, the header and the exhaust pipe into the supply tank. The pumping engine is not necessarily operated during this operation, but it may be if desired, in which case the plungers will be positively withdrawn within the jack cylinders. If the pump is driven the circulation of the fluid is from the cylinder to lower ends of the jack cylinders, by way of the pipes 50, 52, 51 and 53 to the cylinders, the water in the heads of the cylinders exhausting into the supply tank and thence again entering the pumping cylinder.

It will be seen that the sills or feet afford a solid base for the support of the platform and that when they have been adjusted in place to support the platform they may remain in this position without necessitating any change of the foundation upon which they rest, as, for instance, the ties upon which the sills may rest might sink under the weight of the machine, but it is not necessary to rearrange them, as the machine may be lifted by the jacks and fillers placed between the lower ends of the leg or legs, and the sills. The sills also cover considerable area so that there is little likelihood of their being driven into the ground under the weight of the machine.

The sills or foot-pieces not only provide a solid foundation upon which the platform may be raised and lowered, but this foundation or base is portable with the platform when the latter is moved from place to place.

The logging operation being completed, the platform is raised as heretofore described, a transporting car is run under the platform and the proper number of shoring blocks arranged thereon. The valves 63 cooperating with the passage 60, are then opened and the jack-plungers permitted to move up into the cylinders so that the platform settles down onto the shoring blocks as shown in Fig. 2, the feed valves 62 being closed during this operation. As soon as the platform settles into place the feed valves 63 are shut and the valves cooperating with the passages 60 are opened to cause the water to enter the cylinders by the pipes 51 which forces the plungers up into the cylinders and thereby raises the feet or sills up clear of the trackway.

What we claim and desire to secure by Letters Patent of the United States is:—

1. In combination, a portable platform, a substantially horizontal supporting sill carried by the platform and extending longitudinally thereof, spaced legs on the platform depending therefrom and having their lower ends normally disposed over the opposite ends of the sill, power means between said legs, and a connecting member pivoted to said means and to the sill.

2. In combination, a portable platform, a substantially horizontal supporting sill carried by the platform and extending longitudinally thereof, spaced legs on the platform depending therefrom and having their lower ends normally disposed over the opposite ends of the sill, a power means between said legs, a connecting member pivoted to said means and to the sills, and guide means for said connecting member.

3. In a portable logging apparatus, a platform, legs permanently connected thereto, and depending therefrom, each leg comprising spaced members, a link member guided between said spaced members, means for reciprocating said link member, and a foot piece pivoted to said link member.

4. In a portable logging apparatus, a platform, legs permanently connected thereto, and depending therefrom, each leg comprising spaced members, a link member guided between said spaced members, a power cylinder mounted in the leg and the plunger of which is connected to the link member, and a foot piece pivoted to said link member.

5. In a portable logging apparatus, a platform, legs depending therefrom, each leg comprising spaced members, a power cylinder mounted between said members, the plunger of which is guided between said members, a link member connected to the plunger and also guided by said members, and a foot piece pivoted to said link member.

6. In a portable logging apparatus, a platform, legs depending therefrom, each leg including spaced members having channel guides, a power cylinder mounted between the members and having a plunger provided with projections engaging said guides, a link member connected to the plunger and also having projections engaging said guides, and a foot piece pivoted to said link member.

7. In a portable logging apparatus, a platform, legs depending therefrom, each leg including spaced members connected at their lower ends by a transverse member, a link member slidably disposed between and guided by the spaced members, and composed of members straddling said transverse member, power means for operating said link member, and a foot piece pivotally connected to said link member.

In testimony whereof we have hereunto signed our names in the presence of subscribing witnesses.

JOSEPH H. DICKINSON.
ERVIN D. SWAN.

Witnesses:
M. E. McNINCH,
C. G. HEYLMEN.